(No Model.) 3 Sheets—Sheet 1.
C. H. LAND.
APPARATUS FOR FOCUSING FLAME.
No. 553,992. Patented Feb. 4, 1896.
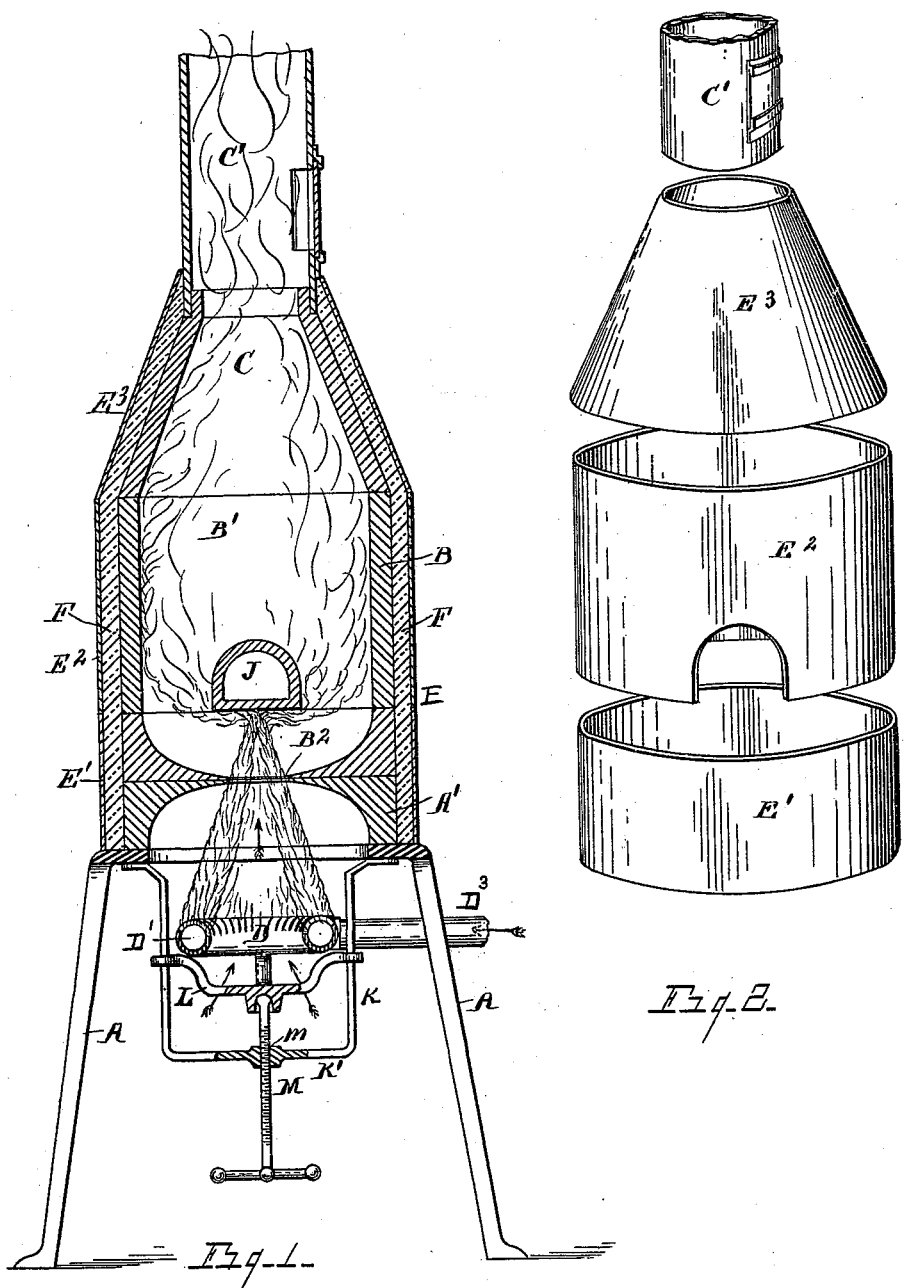
WITNESSES
INVENTOR
Charles H. Land
By his Attorney

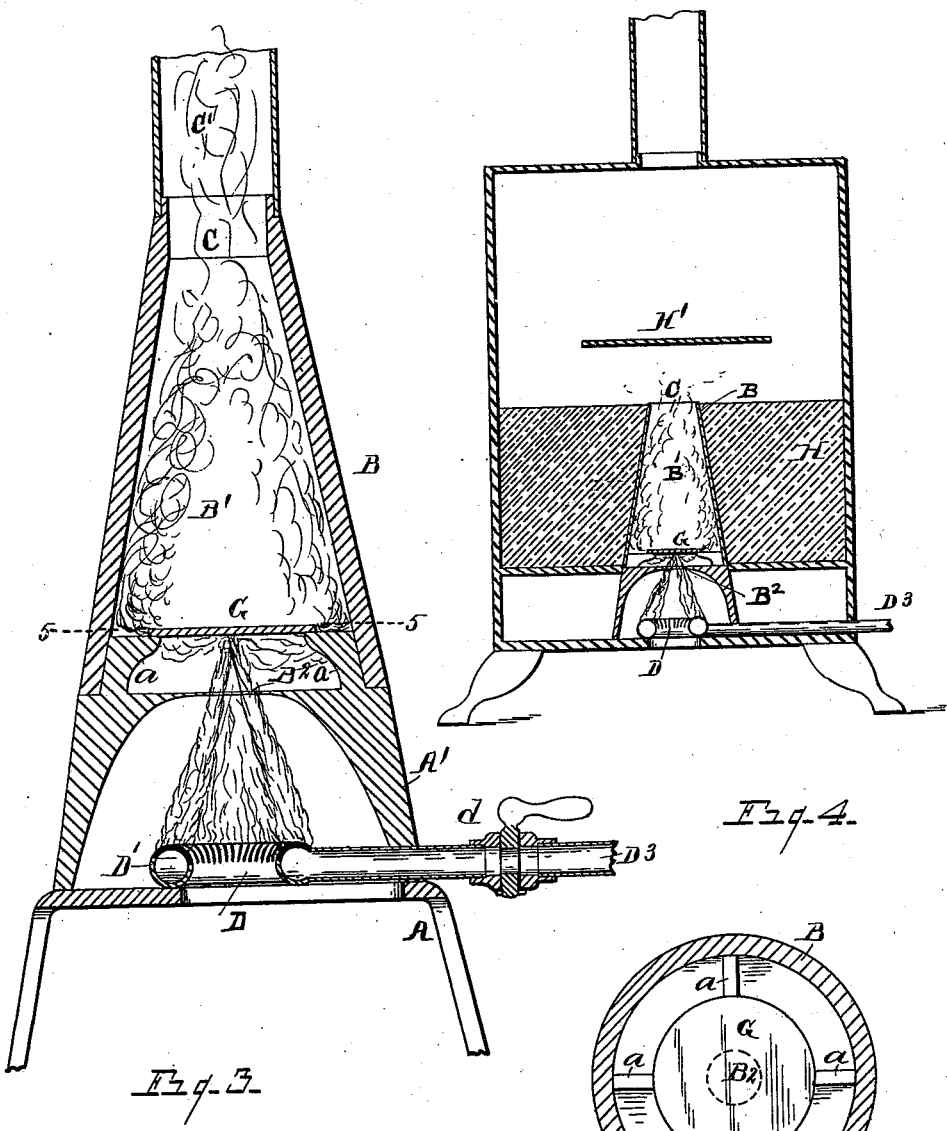

(No Model.) 3 Sheets—Sheet 3.
C. H. LAND.
APPARATUS FOR FOCUSING FLAME.
No. 553,992. Patented Feb. 4, 1896.
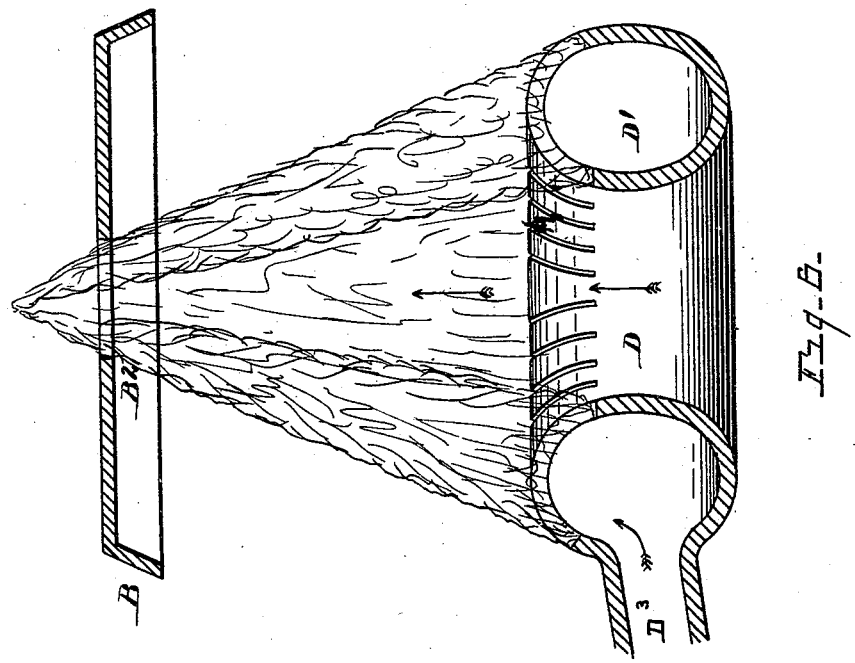
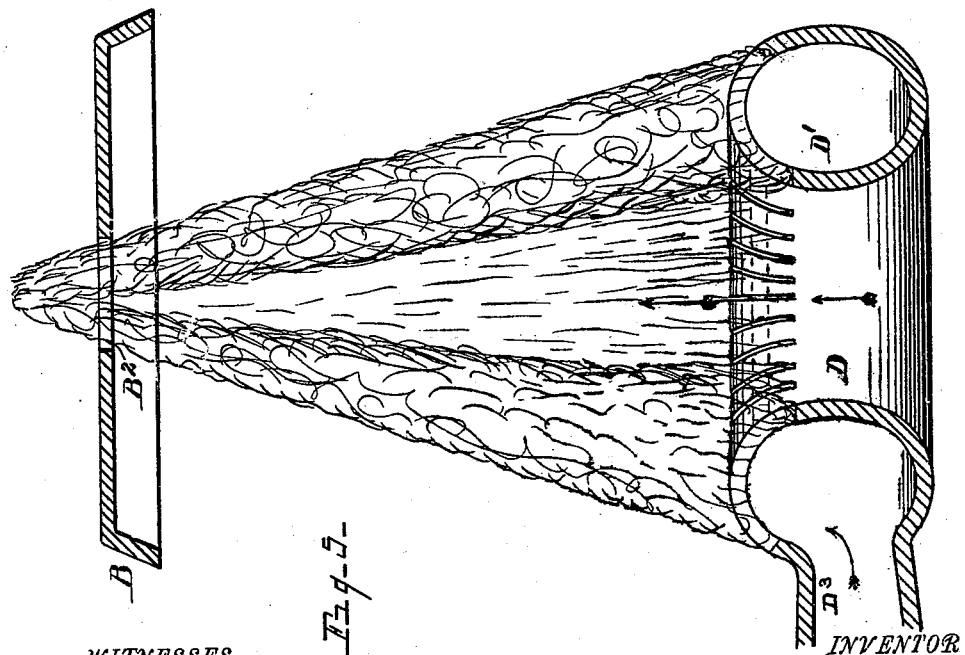
WITNESSES
INVENTOR
Charles H. Land
By his Attorney

UNITED STATES PATENT OFFICE.

CHARLES H. LAND, OF DETROIT, MICHIGAN.

APPARATUS FOR FOCUSING FLAME.

SPECIFICATION forming part of Letters Patent No. 553,992, dated February 4, 1896.

Application filed January 15, 1894. Serial No. 496,886. (No model.)

*To all whom it may concern:*

Be it known that I, CHARLES H. LAND, a citizen of the United States, residing at Detroit, county of Wayne, State of Michigan, have invented a certain new and useful Improvement in an Apparatus for Focusing Flame; and I declare the following to be a full, clear, and exact description of the invention, such as will enable others skilled in the art to which it appertains to make and use the same, reference being had to the accompanying drawings, which form a part of this specification.

My invention consists of an apparatus for focusing flame.

The object of this invention more particularly is to provide a more convenient means and apparatus for securing intense and continuous heat within the combustion-chamber of a heating device—such as a stove, furnace, kiln, melting-pot, &c.

The essential feature of the invention consists in the discovery that flame may be so regulated and controlled within an inclosed space or chamber as to greatly intensify the heat therein.

My invention consists of the means and apparatus hereinafter described and claimed, and illustrated in the accompanying drawings, in which—

Figure 1 is a vertical section of an apparatus embodying my invention. Fig. 2 shows in detail the outer jacket formed in sections. Fig. 3 is a vertical section illustrating features of my invention. Fig. 4 is a view in section showing my improved apparatus applied to a stove. Fig. 5 is a sectional view illustrating the focusing of the flame under certain conditions, and Fig. 6 also illustrates the focusing of the flame under other conditions. Fig. 7 is a section on the line 5 5, Fig. 3.

In the drawings, A represents any suitable support. Mounted upon the support A is the combustion-chamber B', which is contracted at its top where it connects with the flue C', making the chamber larger at its bottom than at its upper end. This construction is necessary, because ample space must be provided for the expansion of the burning gases, and the top of the chamber is contracted for the purpose of concentrating radiated heat that has been collected in an expanded bottom. Were the walls B of the chamber made vertical the top of the chamber would be so large that cold air would be allowed to drop back from the top. The bottom of this chamber is formed by a diaphragm, made of some refractory material, and having a contracted opening $B^2$ made through its center, and which diaphragm is made as thin as possible around the edges of the opening, so as to cause as little friction as possible upon the flame. Were this diaphragm made, say, one inch thick around the edge of this opening, the friction upon the flame would be so great that carbon would begin to collect and soon render the device inoperative. The edge being thin it quickly heats to a point of incandescence, upon which no carbon can collect. This thin-edged diaphragm is one of the requisites of success in the operation of my device.

A ring burner D is used, having an opening through its center for the free passage of air, as shown by the arrows, which air is entrained by the flame, and becoming intensely heated is consumed with the gas, producing a blowpipe heat.

In the instance shown in Fig. 1 the walls B of a combustion-chamber are surrounded by a metal jacket E, which may be made in sections $E'$ $E^2$ $E^3$, fitted the one to the other. (Shown in detail in Fig. 2.) Between the jacket E and the walls B of the combustion-chamber I prefer to locate a packing of asbestos or other analogous material F. The walls B of the combustion-chamber preferably rest upon a supporting-section $A'$, located upon the support A.

In Fig. 3 I have shown a combustion-chamber $B'$ devoid of any jacket, the same being provided toward its base with a spreader G within the combustion-chamber $B'$, said spreader being supported in any suitable manner, as upon lugs $a$, upon the section $A'$. In this instance the orifice $B^2$, through which flame is admitted into the combustion-chamber, is formed in the member $A'$.

In Figs. 3 and 4 particularly the burner D is shown having a fixed location. $D^3$ is a feeding-pipe leading to said burner, said pipe being provided with a controlling-valve $d$. For many purposes this apparatus is very efficient in itself.

In Fig. 4 H is a stove of any construction, in which the burner and combustion-chamber B' are located, the stove being preferably provided with a spreader H' above the top of the walls B.

It will be evident from the drawings that the flame emitted from the burner D passes upward through the orifice B², and when rightly regulated the flame may be focused within the base of the combustion-chamber B', as underneath the spreader G. In place of a spreader G a muffle or other receptacle J may be located within the combustion-chamber and preferably toward its base, as shown in Fig. 1, in which case the said spreader may be omitted and the flame focused under the muffle. The proper focusing of the flame will vary with the amount of gas turned into the burner, and to a certain extent the focusing of the flame may be regulated and adjusted simply by means of the regulating-valve $d$ in the induction-pipe. It will be perceived that the air enters and ascends interiorly of the flame. In Fig. 1, however, I have shown in addition mechanical means for adjusting the burner itself vertically, whereby I am enabled to more effectually regulate the focusing of the flame within the base of the combustion-chamber.

My invention contemplates any suitable adjusting mechanism for adjusting the burner to focus the flame. As shown it consists of supporting-arms K which may engage with the support A. A spider or framework L supports the burner, said spider or framework having a reciprocatory movement upon the arms K. Thus an adjusting-screw M has a threaded engagement in a cross-bar K' of the arms K, as shown at $m$, the upper end of the adjusting-screw having a swiveled engagement with the spider L. It will be evident that by this construction I can readily raise or lower the burner, thereby effectually adjusting the focusing of the flame as required, with varying consumption of gas.

I am thus enabled to regulate the focusing of the flame perfectly and as circumstances may require. I am thus enabled to secure results similar to those secured by an ordinary blowpipe.

In my invention the air is exhausted through the flame by means of a suitable burner and the flue or opening at the top of the combustion-chamber, a draft being thus created. In my invention, also, by means of mechanical devices, I am enabled to regulate the focusing of the flame as above described. All the advantages of a properly-focused flame I thus secure and apply to various forms of heating devices wherein a focus of flame and air is caused to pass through the orifice into the combustion-chamber, and in this manner I am enabled to generate intense degrees of heat in any of the various forms of heating devices now in use. In this manner I am enabled to secure great economy in the saving of fuel due to more perfect combustion, as the apparatus is simple and inexpensive in its construction as an article of manufacture. By thus regulating the flame I am enabled to secure the most perfect combustion.

In practice much depends upon the size or diameter of the opening at the base of the combustion-chamber, as at B², which may, however, be readily regulated in the manufacture of the apparatus, said aperture depending upon the size of the burner and of the combustion-chamber, and the amount of fuel to be consumed in the burner. I have found such an apparatus to be efficient in securing very high degrees of heat. I accomplish this result essentially by arranging a definite-sized orifice above a suitable burner at the base of the combustion-chamber, so constructed that an excess of air may be exhausted through the center of the flame, and by providing means whereby I am enabled to raise and lower the burner in position, so that the distance between it and the orifice may be changed and the flame be brought to a focus, securing perfect combustion, the regulation required depending upon the distance of the burner from the orifice and the quantity of fuel consumed. In these ways degrees of temperature may be secured approximating those of a blast-furnace.

It will be apparent that the air exhausted through the burner becomes superheated by being drawn through and then focused to pass through the aperture B². The flame may then be spread by means of a spreader or muffle thereabove.

Theoretically, as illustrated in Figs. 5 and 6, where a larger quantity of gas is consumed per hour in the burner, the burner needs to be adjusted farther away from the aperture B² to properly focus the flame thereat than where a less quantity of gas is consumed per hour. Thus, for example, where, say, forty-five feet of gas are consumed per hour, the burner, as in Fig. 5, is adjusted farther away from said aperture than when, say, thirty feet of gas are consumed per hour, as illustrated in Fig. 6.

I have found the following estimates to be practically correct where forty-five feet of illuminating-gas $C_2H_4$ have been consumed per hour through a radial burner having a central orifice two inches in diameter. In such a case the aperture at the base of the combustion-chamber should be about one and three-fourths of an inch in diameter, and the burner should be adjusted about three inches distant from said aperture. I find also that the change of a quarter of an inch in diameter of the aperture, either by enlargement or reduction, without regard to the quantity of fuel and air passing through in fixed proportions, will cause a variation of temperature equal to a difference of one thousand degrees—i. e., the amount of heat secured or degree of combustion may be changed in its results simply by changing the diameter of the aperture not more than a quarter of an inch either way. The upper draft of the flame will, of course, tend to create a draft of air upward outside as well as inside the flame, supplying thereby oxygen to support perfect combustion. The column of air passing in the central portion of this length of flame, and that column of air passing outside of the flame, a portion of which passes through the orifice, becomes highly superheated. The excess of hydrogen is taken up in passing through the flame, leaving the free carbon to pass into the combustion-chamber. The heat of the hydrogen, combined with the union of the carbon and superheated oxygen, are focused just beneath the spreading device or muffle. Consequently temperatures are secured equivalent to that of the blowpipe. The spreader or muffle should be located at a little distance above the aperture and spaced therefrom.

What I claim as my invention is—

1. In an apparatus for focusing flame, a diaphragm composed of two sections which are applied together, each section having a concave face so as to form a thin edge around the opening, substantially as shown.

2. In a device for focusing flame, a furnace, legs or uprights upon which it is supported, U-shaped supporting-arms, having a threaded opening through its lower end, an adjusting-screw which passes up through the arms, and a spider which is vertically adjustable upon the arms and forms a support for the burner, combined with a Bunsen burner, and a thin-edged diaphragm at the bottom of the furnace, substantially as specified.

In testimony whereof I sign this specification in the presence of two witnesses.

CHARLES H. LAND.

Witnesses:
N. S. WRIGHT,
OTTO B. BAENZIGER.